United States Patent
Yamashiro et al.

(10) Patent No.: US 9,888,358 B2
(45) Date of Patent: Feb. 6, 2018

(54) VEHICULAR COMMUNICATION TERMINAL

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/531,741

(22) PCT Filed: Dec. 17, 2015

(86) PCT No.: PCT/JP2015/006300
§ 371 (c)(1),
(2) Date: May 31, 2017

(87) PCT Pub. No.: WO2016/103661
PCT Pub. Date: Jun. 30, 2016

(65) Prior Publication Data
US 2017/0272913 A1 Sep. 21, 2017

(30) Foreign Application Priority Data
Dec. 26, 2014 (JP) .................................. 2014-264419

(51) Int. Cl.
*H04W 24/00* (2009.01)
*H04W 4/02* (2009.01)
(Continued)

(52) U.S. Cl.
CPC .......... *H04W 4/027* (2013.01); *H04B 17/318* (2015.01); *H04L 67/141* (2013.01); *H04W 84/18* (2013.01)

(58) Field of Classification Search
CPC ..... H04L 67/16; H04L 67/42; H04L 41/0806; H04L 41/5096; H04L 12/1407;
(Continued)

(56) References Cited

U.S. PATENT DOCUMENTS

| 8,761,676 B2 | 6/2014 | Hu et al. |
| 2009/0177481 A1* | 7/2009 | Curtin ................... G06Q 30/02 705/346 |

(Continued)

FOREIGN PATENT DOCUMENTS

| JP | 2004282591 A | 10/2004 |
| JP | 2013055543 A | 3/2013 |
| JP | 2014131236 A | 7/2014 |

OTHER PUBLICATIONS

"IEEE Guide for Wireless Access in Vehicular Environments (WAVE) Architecture", IEEE Vehicular Technology Society, IEEE Std 1609.0 2013.

*Primary Examiner* — Fred Casca
(74) *Attorney, Agent, or Firm* — Harness, Dickey & Pierce, P.L.C.

(57) ABSTRACT

A vehicular communication terminal is provided. A reception strength acquirer acquires a reception strength of a signal transmitted from a service provider terminal. When the vehicle communication terminal receives a signal corresponding to service initiation information from the service provider terminal, a transmission terminal determiner determines whether a transmission source of the signal is the service provider terminal that provides a service targeted for the vehicular communication terminal, based on at least either one of magnitude of the reception strength of the received signal acquired by the reception strength acquirer and a degree of reception strength change in signal received (Continued)

from the service provider terminal serving as a transmission source of the received signal.

10 Claims, 6 Drawing Sheets

(51) Int. Cl.
    *H04B 17/318*      (2015.01)
    *H04L 29/08*      (2006.01)
    *H04W 84/18*      (2009.01)

(58) Field of Classification Search
    CPC ....... H04L 2012/5631; H04L 29/08153; H04L 41/0823; H04L 41/5012; H04L 41/5054; H04W 4/027; H04W 12/06; H04W 12/08; H04W 40/02
    USPC .... 455/406, 418, 435.1, 456.1, 433; 705/44; 709/203, 221
    See application file for complete search history.

(56) References Cited

U.S. PATENT DOCUMENTS

| | | | |
|---|---|---|---|
| 2009/0213860 A1* | 8/2009 | Liu | H04L 12/2859 370/395.53 |
| 2012/0166256 A1 | 6/2012 | Wang et al. | |
| 2013/0059542 A1 | 3/2013 | Shimizu | |
| 2015/0358481 A1 | 12/2015 | Nagata et al. | |

\* cited by examiner

FIG. 1
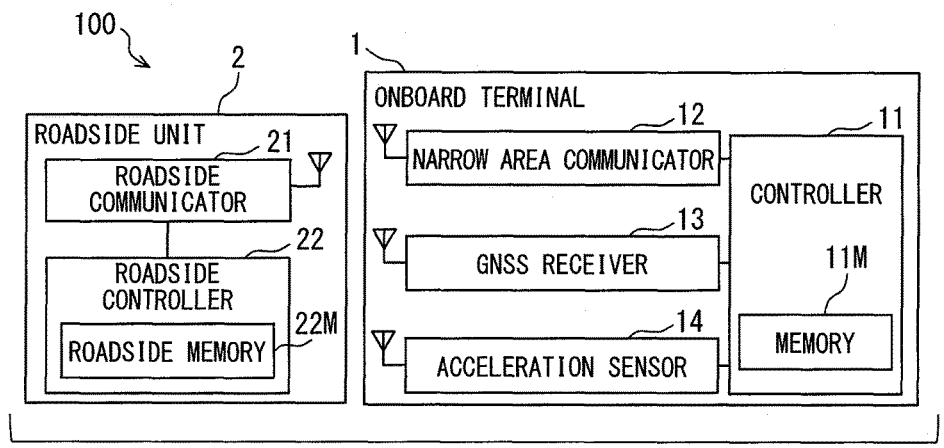
FIG. 2
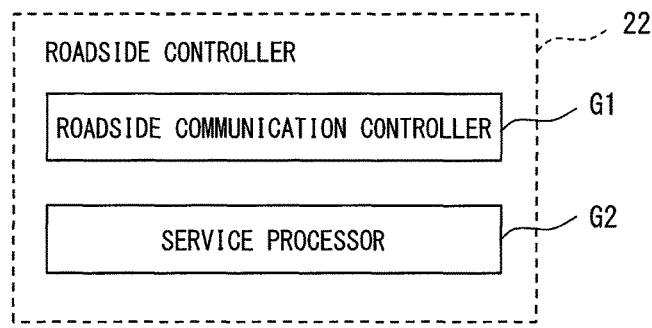
FIG. 3
| HEADER | TERMINAL ID | SERVICE TYPE INFORMATION | CHANNEL USE INFORMATION |
|---|---|---|---|

| TIME | RADIO WAVE STRENGTH | POSITION | SPEED |
|------|---------------------|----------|-------|
| ... | ... | ... | ... |
| ... | ... | ... | ... |
| ... | ... | ... | ... |
| ... | ... | ... | ... |

FIG. 11
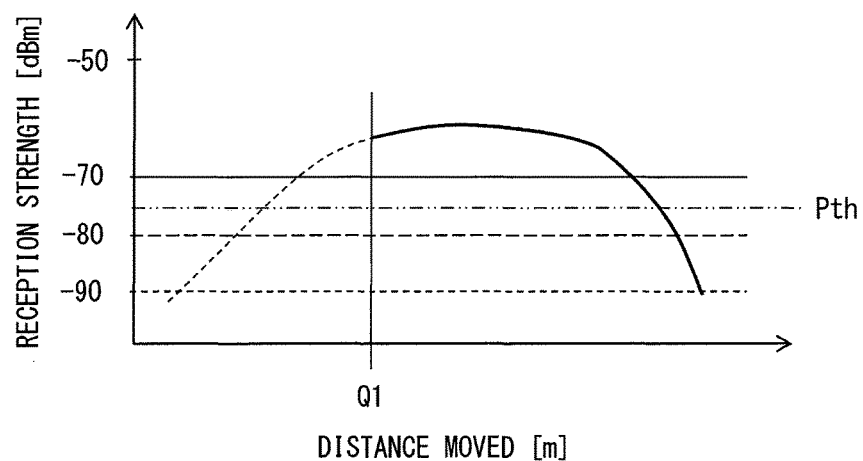
FIG. 12
| HEADER | TERMINAL ID | SERVICE TYPE INFORMATION | CHANNEL USE INFORMATION | INFORMATION ABOUT REQUIRED RECEPTION STRENGTH |
FIG. 13
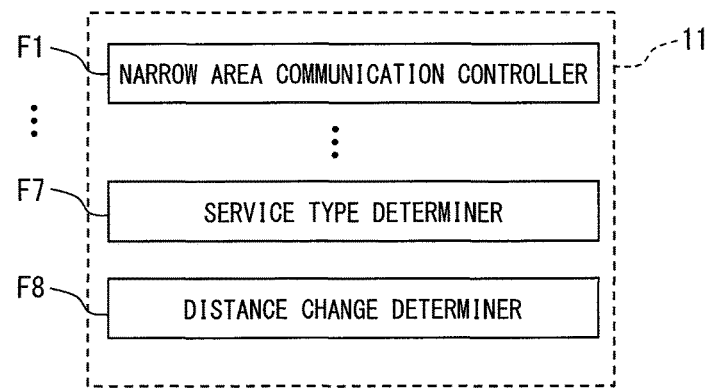

VEHICULAR COMMUNICATION TERMINAL

CROSS-REFERENCE TO RELATED APPLICATIONS

This application is a U.S. National Phase Application under 35 U.S.C. 371 of International Application No. PCT/JP2015/006300 filed on Dec. 17, 2015 and published in Japanese as WO 2016/103661 A1 on Jun. 30, 2016. This application is based on and claims the benefit of priority from Japanese Patent Application No. 2014-264419, filed on Dec. 26, 2014. The entire disclosures of all of the above applications are incorporated herein by reference.

TECHNICAL FIELD

The present disclosure relates to a vehicular communication terminal that is mounted in a vehicle to wirelessly communicate with at least either one of a communication terminal installed along a road and a communication terminal mounted in a different vehicle.

BACKGROUND ART

A communication architecture compliant with WAVE (Wireless Access in Vehicular Environment) is defined in Non-Patent Literature 1. WAVE is a standard for communication between a vehicular communication terminal mounted in a vehicle (hereinafter referred to as an onboard terminal) and an onboard terminal mounted in a different vehicle or a communication terminal installed along a road (hereinafter referred to as a roadside unit).

According to Non-Patent Literature 1, two types of channels, namely, a control channel and a service channel, are used to perform communication between the onboard terminal and a service provider terminal such as a roadside unit. The service provider terminal is a communication terminal managed by a service provider that provides predetermined services.

The service channel is used to transmit and receive information for providing (and receiving) services. The control channel is used to distribute, for example, information (WSA (Wave Service Advertisement)) for initiating communication on the service channel between the onboard terminal and the service provider terminal. A plurality of frequencies are prepared for use on the service channel. The WSA includes service type information and channel information. The service type information indicates the type of service to be provided by a distributor of the WSA. The channel information is used to identify a service channel (i.e., frequency) that is used to provide the service.

The service provider terminal uses the control channel to successively broadcast a WSA for a service to be provided by the service provider terminal. If, for example, a response to the WSA is returned from an onboard terminal, the service provider terminal starts communicating with the onboard terminal by using the service channel.

Upon receipt of a WSA, the onboard terminal performs a process based on the service type information included in the WSA. More specifically, the onboard terminal references the service type information in the received WSA to determine whether the type of service to be provided by a distributor of the WSA is available to the onboard terminal. If the type of service is available to the onboard terminal, the onboard terminal opens a service channel indicated by the received WSA. Opening a service channel is initiating communication with the distributor of the WSA by using a predetermined service channel. By contrast, if the type of service is unavailable to the onboard terminal, the onboard terminal does not open the service channel.

PRIOR ART LITERATURE

Non-Patent Literature

Non-Patent Literature 1: IEEE 1609.0 (Guide for Wireless Access in Vehicular Environment)

SUMMARY OF INVENTION

Under normal conditions, an area to which the service provider terminal distributes a WSA is preferably identical with an area that is passed by a vehicle (more precisely, an onboard terminal) targeted for a service. However, the WSA distribution area of the service provider terminal is not always within an area that is passed by the vehicle targeted for the service. In some cases, the WSA distribution area may be formed to include an area that is passed by a vehicle not targeted for the service.

Consequently, the onboard terminal may receive, in some cases, a WSA for a service that is available to but unnecessary for the onboard terminal. The WSA for a service unnecessary for the onboard terminal is, for example, a WSA distributed from a service provider terminal that provides a service for a vehicle traveling in a lane different from a lane where an onboard-terminal-mounted vehicle (hereinafter referred to as the subject vehicle) is traveling.

In a conventional configuration, upon receipt of a WSA, the onboard terminal references the service type information in the WSA to determine whether the service type indicated by the service type information is available to the onboard terminal. If the service type is available to the onboard terminal, the onboard terminal opens a service channel having a frequency indicated by the WSA.

Consequently, even when the received WSA is for a service unnecessary for the onboard terminal, the onboard terminal opens a service channel indicated by the received WSA as far as the service type indicated by the WSA is available to the onboard terminal. That is, there may arise a case where the onboard terminal opens the service channel for the service unnecessary for the onboard terminal.

An object of the present disclosure is to provide a vehicular communication terminal that is capable of suppressing initiation of communication on a service channel with a service provider terminal that provides a service unnecessary for the vehicular communication terminal.

In an aspect of the present disclosure, a vehicular communication terminal comprises: a wireless communicator that wirelessly communicates with a service provider terminal, the service provider terminal providing a predetermined service by using a control channel and any one of a plurality of service channels, the control channel being used to provide connection control for communication, the service channels being different from the control channel and assigned to provide the service; and a wireless communication controller that controls operations of the wireless communicator. The wireless communicator is adapted to receive at least service initiation information including service type information and service channel information, the service type information being transmitted on the control channel from the service provider terminal and indicative of type of service provided by the service provider terminal, the service channel information designating one of the service channels that is to be used for communication between the service provider terminal and the vehicular communication terminal. The vehicular communication terminal further comprises: a reception strength acquirer that acquires reception strength of a signal transmitted from the service provider terminal and received by the wireless communicator; and a transmission terminal determiner that, when the wireless communicator receives a signal corresponding to the service initiation information from the service provider terminal, determines, based on at least either one of magnitude of the reception strength of the received signal acquired by the reception strength acquirer and a degree of reception strength change in signal received from the service provider terminal serving as a transmission source of the received signal (hereinafter referred to as a transmission terminal), whether the transmission terminal is the service provider terminal that provides a service targeted for the vehicular communication terminal. Until the transmission terminal determiner determines that the transmission terminal is the service provider terminal that provides the service targeted for the vehicular communication terminal, the wireless communication controller does not initiate communication with the transmission terminal by using the service channel designated by the service channel information included in the service initiation information transmitted from the transmission terminal.

In the above-described configuration, the reception strength acquirer acquires the reception strength of the signal transmitted from the service provider terminal, and the transmission terminal determiner determines, based on at least either one of the magnitude of the reception strength and the degree of reception strength change in signal transmitted from the transmission terminal, whether the transmission terminal is a service provider terminal that provides a service targeted for the vehicular communication terminal.

The degree of reception strength change may be a degree of reception strength change with respect to a movement distance of the vehicular communication terminal or a degree of reception strength change over time. The reason is that the position of the vehicular communication terminal relative to the service provider terminal is expected to change over time because of use of the vehicular communication terminal in a vehicle. That is, even if the degree of reception strength change is the degree of change per unit time, it indirectly represents the degree of reception strength change with respect to the movement distance of the vehicular communication terminal.

In order to explain about the operation of the transmission terminal determiner, first of all, a brief description will be given to explain about the difference in reception strength change caused by the movement of the vehicular communication terminal and the difference in reception strength between a case where the vehicular communication terminal receives a signal from a service provider terminal that provides the service targeted for the vehicular communication terminal (hereinafter referred to as a service provider terminal for the subject terminal) and a case where the vehicular communication terminal receives a signal from a service provider terminal that does not provide the service targeted for the vehicular communication terminal (hereinafter referred to as a service provider terminal not for the subject terminal).

The service provider terminal for the subject terminal is, for example, a service provider terminal that provides a service targeted for vehicles traveling in a lane where the vehicle mounted with the vehicular communication terminal (hereinafter referred to as the subject vehicle) is traveling.

The service provider terminal not for the subject terminal is, for example, a service provider terminal that provides a service targeted for vehicles traveling in a lane other than a lane where the subject vehicle is traveling (e.g., an oncoming vehicle).

While the vehicular communication terminal is receiving a signal from the service provider terminal not for the subject terminal, the reception strength change caused by the movement of vehicular communication terminal is more moderate than the reception strength change caused while the vehicular communication terminal is receiving a signal from the service provider terminal for the subject terminal. Further, the magnitude of reception strength change caused while the vehicular communication terminal is receiving a signal from the service provider terminal not for the subject terminal varies within a relatively small region.

The reason is that, as compared to the service provider terminal for the subject terminal, the service provider terminal not for the subject terminal is disposed relatively apart from a lane where the subject vehicle is traveling. More specifically, a radio signal attenuates its signal strength as it propagates in air. Therefore, even if a signal transmitted from the service provider terminal not for the subject terminal reaches a lane where the subject vehicle is traveling, it is highly probable that the strength of the transmitted signal is sufficiently attenuated due to its propagation over a relatively long distance.

Meanwhile, the service provider terminal for the subject terminal is disposed near a lane where the subject vehicle travels, and transmits a signal toward the lane where the subject vehicle travels. Therefore, the vehicular communication terminal receives a relatively strong signal.

Consequently, the degree of reception strength change caused when the vehicular communication terminal approaches and leaves the service provider terminal for the subject terminal is higher than when the vehicular communication terminal approaches and leaves the service provider terminal not for the subject terminal.

More specifically, the degree of increase in reception strength when the vehicular communication terminal approaches the service provider terminal for the subject terminal is higher than when the vehicular communication terminal approaches the service provider terminal not for the subject terminal. Further, the degree of decrease in reception strength when the vehicular communication terminal leaves the service provider terminal for the subject terminal is higher than when the vehicular communication terminal leaves the service provider terminal not for the subject terminal.

Moreover, it is foreseen that the reception strength in a case where the vehicular communication terminal is sufficiently near the service provider terminal for the subject terminal is noticeably greater than in a case where the vehicular communication terminal is closest to the service provider terminal not for the subject terminal.

That is, the tendency of reception strength change and the magnitude of reception strength in a case where the vehicular communication terminal is receiving a signal from the service provider terminal for the subject terminal are significantly different from a case where the vehicular communication terminal is receiving a signal from the service provider terminal not for the subject terminal. Therefore, the transmission terminal determiner is able to determine based on the above indexes whether the service provider terminal transmitting the currently received service initiation information is a roadside unit for the subject terminal.

When the reception of a signal from a service provider terminal begins, the wireless communication controller does not initiate communication on a service channel until the transmission terminal determiner determines that the service provider terminal provides the service targeted for the subject terminal. In this instance, it is relatively likely that the service provider terminal, which is not determined to be a service provider terminal for the subject terminal, provides a service targeted for vehicles traveling in a lane different from a lane where the subject vehicle is traveling. Thus, the services provided by that service provider terminal are not necessary for the subject terminal.

Consequently, the above-described configuration enables the vehicular communication terminal to suppress the initiation of communication on a service channel with a service provider terminal that provides services unnecessary for the subject terminal.

BRIEF DESCRIPTION OF DRAWINGS

The above and other objects, features, and advantages of the present disclosure will become more apparent from the following detailed description made with reference to the accompanying drawings. In the drawings:

FIG. 1 is a block diagram illustrating an outline configuration of a mobile communication system according to an embodiment of the present disclosure;

FIG. 2 is a block diagram illustrating an exemplary outline configuration of a roadside controller;

FIG. 3 is a diagram illustrating an exemplary outline configuration of a WSA;

FIG. 11 is a diagram illustrating effects that are produced when a reception strength is compared with a threshold strength value to determine whether a transmission terminal is a roadside unit that provides services to the subject terminal;

FIG. 12 is a diagram illustrating an exemplary outline configuration of the WSA according to a first modification; and FIG. 13 is a block diagram illustrating an exemplary outline configuration of the controller according to a sixth modification.

DESCRIPTION OF EMBODIMENT

Figure 4:
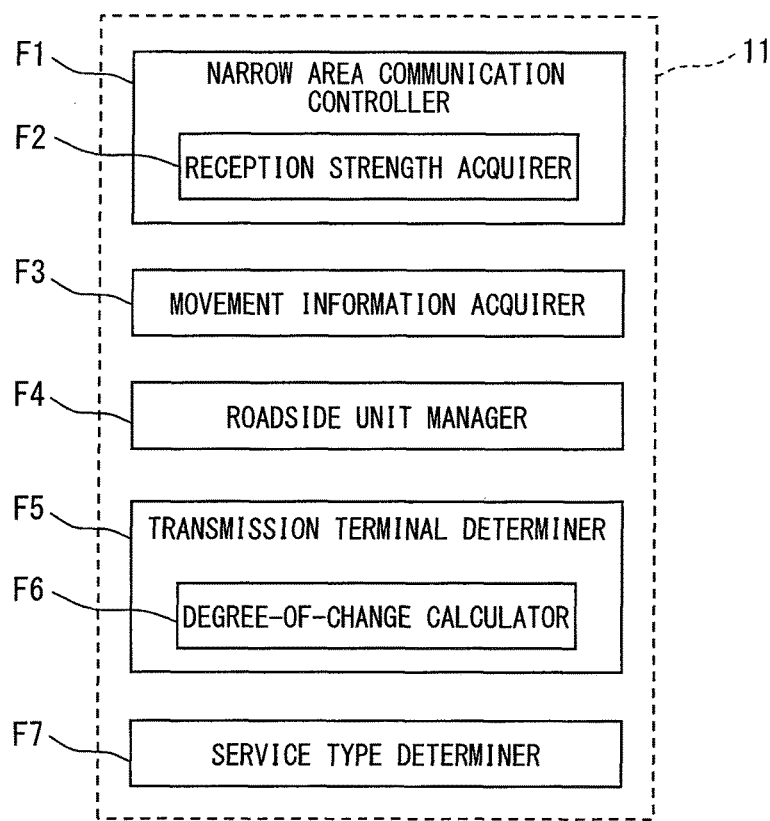
FIG. 4 is a block diagram illustrating an outline configuration of a controller included in an onboard unit.

An embodiment of the present disclosure will now be described with reference to the accompanying drawings. FIG. 1 is a diagram illustrating an exemplary outline configuration of a mobile communication system 100 according to the present embodiment. As illustrated in FIG. 1, the mobile communication system 100 includes a roadside unit 2 and an onboard unit 1. The roadside unit 2 is a communication terminal installed along a road. The onboard unit 1 is a communication terminal used in a vehicle. The onboard unit 1 corresponds to a vehicular communication terminal.

For the sake of convenience, FIG. 1 shows only one roadside unit 2. However, the mobile communication system 100 may include a plurality of roadside units 2. The onboard unit 1 is mounted in each of a plurality of vehicles. Therefore, the mobile communication system 100 includes a plurality of onboard units 1. When the onboard unit 1 and the roadside unit 2 are not to be distinguished from each other, they are hereinafter simply referred to as the communication terminals.

The onboard unit 1 and the roadside unit 2 perform so-called road-to-vehicle communication to communicate with each other in compliance with the WAVE (Wireless Access in Vehicular Environment) standard described in Non-Patent Literature 1. More specifically, the road-to-vehicle communication between the onboard unit 1 and the roadside unit 2 is performed by using a control channel and one of a plurality of service channels.

The control channel is for broadcasting. The control channel is used when, for example, the roadside unit 2 transmits a WSA (Wave Service Advertisement), which is a message for initiating communication on a predetermined service channel with an onboard unit 1 existing in the vicinity of the subject terminal. The WSA will be described later in detail. The vicinity of a communication terminal is an area where the communication terminal is able to perform wireless communication (this area will be hereinafter referred to as the wireless communication area). The wireless communication area of each communication terminal may be designed as appropriate.

The service channels are used to communicate with a specific communication terminal. That is, unicast or multicast communication is performed on the service channels. The service channels are used, for example, by the onboard unit 1 and the roadside unit 2 to transmit and receive information related to the provision (or reception) of a predetermined service.

It is assumed here, for example, that the mobile communication system 100 includes four service channels, namely, a first service channel, a second service channel, a third service channel, and a fourth service channel. The control channel and the service channels are implemented by using different frequencies. Both the control channel and the service channels are frequencies in a 5.8 GHz band or a 5.9 GHz band.

In a communication terminal, the service channels may be identified by an assigned number (channel number). Further, the service channels and the control channel may be implemented by using not only frequencies in the 5.8 GHz or 5.9 GHz band but also frequencies in a 2.4 GHz band or frequencies in another frequency band (700 MHz). Furthermore, each channel may be implemented by applying a time division multiplexing technology to one or more frequencies.

The present embodiment will be described mainly with reference to communication between the onboard unit 1 and the roadside unit 2. However, it is obvious that the onboard unit 1 may perform vehicle-to-vehicle communication with a different onboard unit 1 in compliance with the WAVE standard.

An identification code (referred to as a terminal ID) for identifying a plurality of communication terminals is set for each of the communication terminals (i.e., onboard unit 1 and roadside unit 2) in the mobile communication system 100. Data transmitted from a communication terminal includes its terminal ID. Therefore, upon receipt of data, a communication terminal is able to identify a transmission source terminal by the terminal ID included in the data. The roadside unit 2 and the onboard unit 1 will be outlined below together with their configurations.

(Roadside Unit 2)

The roadside unit 2 performs road-to-vehicle communication with an onboard unit 1 existing in the wireless communication area formed by the roadside unit 2, and provides predetermined services by transmitting various information to the onboard unit 1 and acquiring various information from the onboard unit 1. The roadside unit 2 corresponds to an example of a service provider terminal.

The roadside unit 2 may be disposed at a position suitable for services provided by the roadside unit 2. For example, the roadside unit 2 may be disposed at an intersection, along a road (a so-called link) connecting one intersection to another, or at an entrance and exit of a specific institution (e.g., parking lot, store, or toll road). The wireless communication area of the roadside unit 2 is preferably formed to include an area that can be passed through by a vehicle to which services are to be provided by the roadside unit 2, and exclude an area that is passed through by a vehicle to which the services are not to be provided.

When, for instance, the roadside unit 2 provides a traffic information transmission service for transmitting driving support information, which helps a driver recognize and determine a traffic situation around the roadside unit 2, the roadside unit 2 may be disposed at an intersection or along a road. The driving support information is, for example, congestion information about an area around the roadside unit and information about vehicles, pedestrians, and obstacles that are in an area around the roadside unit and in a blind spot of the driver. The area around the roadside unit may be a range that is appropriately designed based on the position of the roadside unit.

If the roadside unit 2 transmits driving support information related only to a vehicle traveling in a particular lane, the wireless communication area of the roadside unit 2 is preferably formed to cover no other lane.

If the roadside unit 2 provides a payment service for paying for services or goods received at a predetermined institution, the roadside unit 2 may be installed to form a desired wireless communication area in the vicinity of an entrance and exit of the institution.

The institution that provides a payment service by using the roadside unit 2 is, for example, a toll parking lot and various stores such as a restaurant, a bank, a laundry, and a gas station. The roadside unit 2 may be disposed at an entrance and exit of a toll road and used to perform road-to-vehicle communication for billing the driver of a vehicle for traveling on the toll road based on the use of the toll road (e.g., traveled section and time zone). Further, the roadside unit 2 may provide a service to check for an abnormality in the onboard unit 1 and in a vehicle in which the onboard unit 1 is mounted.

In the present embodiment, the onboard unit 1 and a vehicle in which the onboard unit 1 is mounted correspond to each other on a one-to-one basis. Even when the subject or object of actions is the onboard unit 1 in a strict sense, the configuration and operation of the present embodiment will be described on the assumption that a vehicle in which the onboard unit 1 is mounted is the subject or object of actions. For example, a vehicle to which services are to be provided by the roadside unit 2 signifies the onboard unit 1 to which the services are to be provided, and a vehicle to which services are not to be provided by the roadside unit 2 signifies the onboard unit 1 to which the services are not to be provided.

The roadside unit 2 uses the control channel to broadcast a WSA successively (e.g., at 100 millisecond intervals). When, for example, the onboard unit 1 responds to the WSA, the roadside unit 2 initiates communication with the onboard unit 1 by using a service channel that is preassigned or dynamically assigned. The roadside unit 2 then performs a series of processes to provide services such as a payment service by performing communication on the service channel with the onboard unit 1 to transmit and receive various information to and from the onboard unit 1.

As illustrated in FIG. 1, the above-described roadside unit 2 includes a roadside communicator 21 and a roadside controller 22. The roadside communicator 21 and the roadside controller 22 are communicatively connected to each other.

The roadside communicator 21 includes an antenna that is capable of transmitting and receiving radio waves in a frequency band used to communicate with the onboard unit 1. The roadside communicator 21 performs road-to-vehicle communication through the antenna with the onboard unit 1 existing in the wireless communication area formed by the roadside unit 2. The roadside communicator 21 not only demodulates a signal received from the onboard unit 1 and outputs the demodulated signal to the roadside controller 22, but also modulates data inputted from the roadside controller 22, converts the modulated data to radio waves, and transmits the radio waves.

The roadside communicator 21 has two operating modes, namely, a mode for performing communication on the control channel and a mode for performing communication on a service channel. That is, the communication on the control channel with the onboard unit 1 and the communication on a service channel with the onboard unit 1 are both performed through the roadside communicator 21.

For example, the roadside unit 2 switches between communication on the control channel and communication on a service channel at predetermined time intervals (e.g., at 50 millisecond intervals). The period of time during which the control channel is used for communication and the period of time during which a service channel is used for communication may be designed as appropriate. Both of these periods of time may be dynamically changed as needed. Further, communication on the control channel may be maintained until the reception of a response from the onboard unit 1 to the WSA successively transmitted on the control channel.

Switching between the mode for performing communication on the control channel and the mode for performing communication on a service channel may be performed in compliance with an instruction from the roadside controller 22. Further, the service channel (one of the first to fourth service channels) to be used may be preset for each roadside unit (or for each service) or dynamically determined based on channel availability.

The roadside controller 22 is configured as a common computer that includes a well-known CPU, a nonvolatile memory such as a ROM or a flash memory, a volatile memory such as a RAM, an I/O device, and a bus line connecting these elements (none of these elements is shown).

A roadside memory 22M included in the roadside controller 22 is a nonvolatile storage medium and implemented, for example, by a flash memory or ROM included in the roadside controller 22. The roadside memory 22M stores, for example, a program module and data for performing various processes and a terminal ID assigned to the roadside unit 2. The roadside memory 22M also stores information about the service channels (channel number, etc.) used to provide services.

The roadside controller 22 is a functional block that is implemented by executing the above-mentioned program module. As illustrated in FIG. 2, the roadside controller 22 includes a roadside communication controller G1 and a service processor G2. Some or all functions executed by the roadside controller 22 may be implemented by hardware such as one IC or a plurality of ICs.

The roadside communication controller G1 controls the operation of the roadside communicator 21 and switches between communication on the control channel and communication on a service channel. The roadside communication controller G1 generates data to be transmitted from the roadside communicator 21 based on the operating mode of the roadside communicator 21, and causes the roadside communicator 21 to transmit the generated data. Further, the roadside communication controller G1 acquires data received by the roadside communicator 21 and supplies the acquired data to the service processor G2.

More specifically, while the roadside communicator 21 is engaged in communication on the control channel, the roadside communication controller G1 generates data to be transmitted on the control channel, and causes the roadside communicator 21 to transmit the generated data. For example, the roadside communication controller G1 generates a WSA for a service to be supplied from the subject terminal, and causes the roadside communicator 21 to transmit the generated WSA. The WSA corresponds to service initiation information.

FIG. 3 is a diagram illustrating an exemplary configuration of the WSA in the present embodiment. As illustrated in FIG. 3, the WSA includes a header, a terminal ID, service type information, and channel use information. The header is information that causes a receiving-end communication terminal (i.e., onboard unit 1) to recognize that received data is a WSA. The header may include information that indicates the version of the WAVE standard, and information that distinguishes the WSA from a different message used by the WAVE standard.

The terminal ID is a terminal ID of the roadside unit 2 that transmits the WSA. The terminal ID permits the onboard unit 1, which has received the WSA, to identify a transmission terminal that has transmitted the received WSA. Although FIG. 3 indicates that the terminal ID is an item separate from the header, the terminal ID may be included in the header or included in an external region (e.g., data link layer frame) of the WSA.

The service type information indicates the type of service to be provided by the roadside unit 2. The service type information is represented by a service ID (so-called PSID (Provider Service ID)) that is preassigned to each service type. Upon receipt of a WSA, the onboard unit 1 references the service type information included in the WSA to identify the type of service corresponding to the WSA, that is, identify the type of service provided by the roadside unit 2 from which the WSA is transmitted.

The channel use information indicates the channel number of a service channel (one of the first to fourth service channels) that the roadside unit 2 uses to provide a service. The onboard unit 1 references the channel use information to identify the service channel that the roadside unit 2 uses to provide a service. The channel use information corresponds to service channel information.

While the roadside communicator 21 is engaged in communication on a service channel, the roadside communication controller G1 generates data to be transmitted on the service channel, and causes the roadside communicator 21 to transmit the generated data. Further, the roadside communication controller G1 acquires data that is received by the roadside communicator 21 while it is engaged in communication on the service channel, and supplies the acquired data to the service processor G2.

Based on information supplied from the roadside communication controller G1, the service processor G2 provides a predetermined service (e.g., payment service) to an onboard unit 1 existing in the wireless communication area. In the present embodiment, a situation where the roadside unit 2 provides a service to the onboard unit 1 includes a mode in which the roadside unit 2 provides a service through the onboard unit 1 to a vehicle in which the onboard unit 1 is mounted or to an occupant of the vehicle.

(Onboard Unit 1)

The onboard unit 1 will now be described. Upon receipt of a WSA transmitted on the control channel from a roadside unit 2 that meets predetermined conditions (detailed later), the onboard unit 1 initiates communication on a predetermined service channel with the roadside unit 2 from which the WSA is transmitted. The onboard unit 1 then receives a service provided by the roadside unit 2 by transmitting and receiving various information on the service channel to and from the roadside unit 2. Initiating communication on a predetermined service channel with the roadside unit 2 may be hereinafter referred to as opening a service channel.

While a predetermined service channel is not open, the onboard unit 1 perform receiving the control channel or uses a certain service channel at fixed time intervals (e.g., at 50 millisecond intervals) to establish vehicle-to-vehicle communication with a different onboard unit 1.

As illustrated in FIG. 1, the onboard unit 1 includes a controller 11, a narrow area communicator 12, a GNSS receiver 13, and an acceleration sensor 14. The controller 11 is communicatively connected to the narrow area communicator 12, the GNSS receiver 13, and the acceleration sensor 14.

The narrow area communicator 12 has an antenna that is capable of transmitting and receiving radio waves in a frequency band used to communicate with the roadside unit 2 or with a different onboard unit 1, and uses the antenna to wirelessly communicate with a different communication terminal (e.g., roadside unit 2) existing in the wireless communication area. More specifically, the narrow area communicator 12 not only demodulates a signal received by the antenna and outputs the demodulated signal to the controller 11, but also modulates data inputted from the controller 11, converts the modulated data to radio waves, and transmits the radio waves. The signal received by the narrow area communicator 12 is, for example, a WSA or other message transmitted from the roadside unit 2.

As is the case with the roadside communicator 21, the narrow area communicator 12 has two operating modes, namely, a mode for communication on the control channel and a mode for communication on a service channel. That is, the communication on the control channel and the communication on a service channel are both performed through the narrow area communicator 12. The narrow area communicator 12 corresponds to a wireless communicator.

Switching from communication on the control channel to communication on a service channel and switching from communication on a service channel to communication on the control channel may be performed in compliance with an instruction from the controller 11. Further, the service channel (one of the first to fourth service channels) to be used for communication may also be determined in compliance with an instruction from the controller 11.

The narrow area communicator 12 outputs a radio wave strength of a received signal (hereinafter referred to as the reception strength) to the controller 11 in association with received data included in the received signal. The reception strength may be measured, for example, with a well-known RSSI circuit.

The GNSS receiver 13 acquires data indicative of its current position by receiving radio waves from a satellite used in a GNSS (Global Navigation Satellite System). Current position information acquired by the GNSS receiver 13 may be expressed, for example, by latitude, longitude, and altitude. It is assumed that altitude information indicates the height from a predetermined reference plane (e.g., sea level). Position information acquired by the GNSS receiver 13 is supplied to the controller 11 successively (e.g., at 100 millisecond intervals).

The acceleration sensor 14 detects acceleration that is exerted in the front-rear direction of subject vehicle. The onboard unit 1 is assumed to be mounted in the subject vehicle in a predetermined posture so that the direction of acceleration detection by the acceleration sensor 14 coincides with the front-rear direction of the subject vehicle. Here, the subject vehicle is a vehicle in which the onboard unit 1 is mounted. The acceleration sensor 14 is preferably a three-axis acceleration sensor for detecting acceleration that is exerted in three orthogonal axial directions of the subject vehicle, namely, the front-rear direction, left-right direction, and up-down direction of the subject vehicle.

The controller 11 is configured as a common computer that includes a well-known CPU, a nonvolatile memory such as a ROM or a flash memory, a volatile memory such as a RAM, an I/O device, and a bus line connecting these elements (none of these elements is shown).

A memory 11M included in the controller 11 has a nonvolatile storage area and a rewritable storage area, and is implemented, for example, by a flash memory, ROM, or RAM included in the controller 11. The nonvolatile storage area of the memory 11M stores, for example, a program module and data (e.g., later-described various threshold values) for performing various processes and a terminal ID assigned to the onboard unit 1.

Data showing a service list, which is a list of services available to the onboard unit 1, is also stored in a nonvolatile or, more preferably, a rewritable storage area of the memory 11M. The service list may be a list of service IDs representing services available to the onboard unit 1. The services available to the onboard unit 1 include services that are available through the onboard unit 1 to the subject vehicle or to an occupant of the subject vehicle. The memory 11M corresponds to a service memory. The rewritable storage area of the memory 11M stores a later-described nearby roadside unit list.

The controller 11 is a functional block that is implemented by executing the above-mentioned program module. As illustrated in FIG. 4, the controller 11 includes a narrow area communication controller F1, a reception strength acquirer F2, a movement information acquirer F3, a roadside unit manager F4, a degree-of-change calculator F6, a transmission terminal determiner F5, and a service type determiner F7. Some or all functions executed by the controller 11 may be implemented by hardware such as one IC or a plurality of ICs.

The narrow area communication controller F1 controls the operation of the narrow area communicator 12 and switches between communication on the control channel and communication on a service channel. Further, the narrow area communication controller F1 generates data to be transmitted from the narrow area communicator 12 based on the operating mode of the narrow area communicator 12, and causes the narrow area communicator 12 to transmit the generated data. Furthermore, the narrow area communication controller F1 acquires data received by the narrow area communicator 12 and supplies the acquired data to a different functional block (e.g., service type determiner F7) or performs processing based on the received data.

For example, while the narrow area communicator 12 is engaged in communication on the control channel, the narrow area communication controller F1 acquires, for example, a WSA that is to be transmitted on the control channel by the roadside unit 2.

The reception strength acquirer F2 included in the narrow area communication controller F1 is a functional block that acquires the reception strength at a time when the narrow area communicator 12 receives a signal (e.g., WSA) transmitted from the roadside unit 2. When a WSA is acquired, the narrow area communication controller F1 supplies the WSA to the roadside unit manager F4 in association with the reception strength at the time of receipt of the WSA.

Further, if, in a reception-related process (detailed later) performed upon receipt of a WSA, the WSA is determined to be transmitted from a roadside unit 2 that provides services to the subject terminal, the narrow area communication controller F1 initiates communication on a predetermined service channel with the roadside unit 2. The predetermined service channel is one of the first to fourth service channels and designated by the channel use information about the WSA transmitted from the roadside unit 2. The narrow area communication controller F1 corresponds to a wireless communication controller.

Based on a signal inputted from the GNSS receiver 13, the movement information acquirer F3 detects the current position of the subject terminal successively (e.g., at 100 millisecond intervals). Further, the movement information acquirer F3 preferably acquires the movement speed of the subject terminal successively (e.g., at 100 millisecond intervals). The movement information acquirer F3 may calculate the movement speed of the subject terminal, for example, by integrating values outputted from the acceleration sensor 14. Alternatively, the movement information acquirer F3 may calculate the movement speed from the amount of current position change per unit time.

The position information acquired by the GNSS receiver 13 may be corrected based on values detected by the acceleration sensor 14 and a gyro sensor (not shown) by using a well-known method. Further, the current position of the subject terminal may be autonomously estimated based on values detected by the acceleration sensor 14 and the gyro sensor by using a well-known self-contained navigation method. The movement information acquirer F3 need not always perform a process of identifying the current position. An alternative is to let a position detector including the GNSS receiver 13 perform a calculation process for identifying the current position and permit the movement information acquirer F3 to acquire the result of the calculation process.

The current position and movement speed of the subject terminal, which are acquired by the movement information acquirer F3, are supplied to the roadside unit manager F4. Information indicative of the position of the subject terminal and information indicative of the movement speed of the subject terminal will be hereinafter collectively referred to as the movement information. The movement information is used, for example, to determine whether the subject terminal is moving and determine the movement distance of the subject terminal.

Based on the WSA and its reception strength, which are inputted from the narrow area communication controller F1, the roadside unit manager F4 manages information about a roadside unit 2 existing in the vicinity of the subject terminal. The vicinity of the subject terminal is a range where a transmission source of a currently received signal exists, and includes at least the wireless communication area of the subject terminal.

More specifically, based on a terminal ID included in the WSA acquired from the narrow area communication controller F1, the roadside unit manager F4 identifies roadside units 2 existing in the vicinity of the subject terminal, and retains roadside unit information about each roadside unit 2 existing in the vicinity of the subject terminal. For example, based on the nearby roadside unit list (see FIG. 5), which is a list of roadside units 2 existing in the vicinity of the subject terminal, the roadside unit manager F4 retains the roadside unit information about each roadside unit 2 existing in the vicinity of the subject terminal. The nearby roadside unit list illustrated in FIG. 5 indicates a case where three roadside units 2 having terminal IDs of 1, 3, and 4 exist in the vicinity of the subject terminal.

Figure 5:
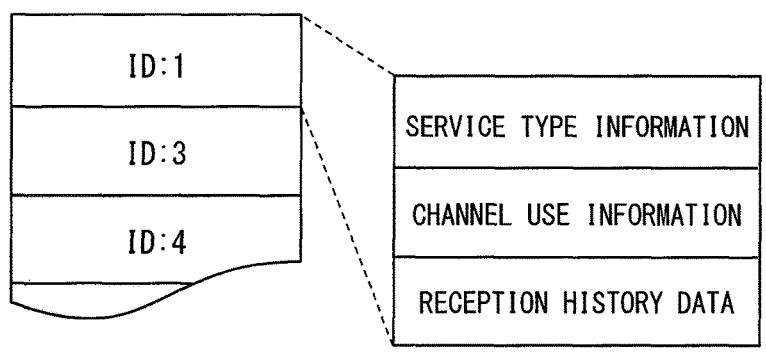
FIG. 5 is a block diagram illustrating an outline configuration of a nearby roadside unit list.

As illustrated in FIG. 5, the roadside unit information includes service type information, channel use information, and reception history data. The service type information indicates the type of service to be provided by a roadside unit 2. The channel use information indicates a service channel used to provide the service. The reception history data indicates a reception history of WSAs transmitted from the roadside unit 2.

The service type information is similar to the service type information included in a WSA. For example, a service ID included in a received WSA is stored as the service type information. The channel use information is also similar to the channel use information included in a WSA, and is represented, for example, by a channel number.

Figures 6, 7:
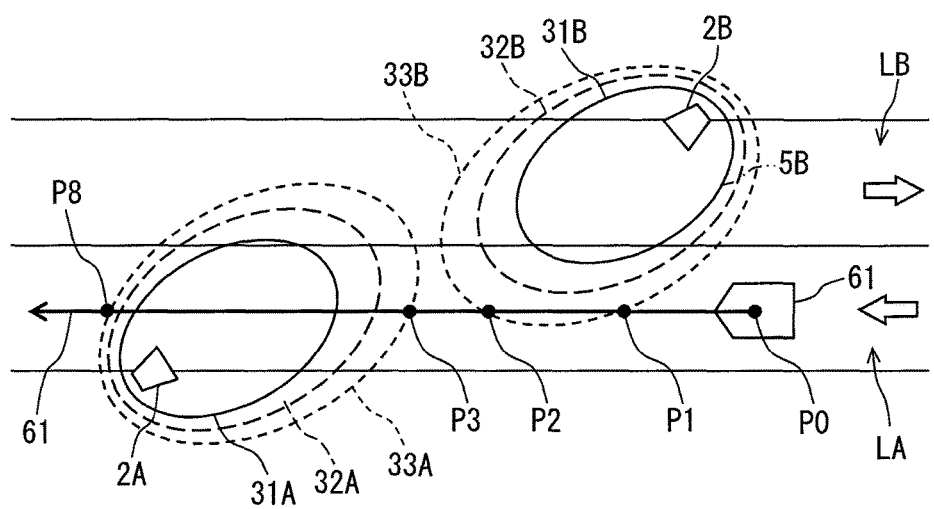
FIG. 6 is a block diagram illustrating a configuration of reception history data.
FIG. 7 is a diagram illustrating determination principles of a transmission terminal determiner.

As illustrated in FIG. 6, the reception history data indicates the association between reception time and reception strength concerning the reception of a WSA from a roadside unit 2 corresponding to the roadside unit information to which the reception history data belongs. In the present embodiment, the reception history data is preferably stored by associating the prevailing position and speed of the subject terminal with the reception strength and reception time concerning the reception of the WSA. The position information and speed information are used to determine the movement of the subject terminal, that is, determine whether the subject terminal is moving and determine the movement distance of the subject terminal. The reception history data may be successively updated (for example, by adding data to the reception history data) each time a WSA is received from the roadside unit 2.

In a case illustrated here, each time a WSA is received from a roadside unit 2, the roadside unit manager F4 updates the roadside unit information (mainly the reception history data) about the roadside unit 2 that has transmitted the WSA. However, there may be an alternative case. Each time a signal including information identifying a transmission source is received instead of a WSA, the roadside unit information about a roadside unit 2 having transmitted the received signal may be updated. The information identifying a transmission source other than a WSA is, for example, a message other than a WSA.

Further, the service type information and channel use information included in the roadside unit information need not be updated upon each reception of a WSA. Such data may be retained once it is registered.

Based on the reception history data about each roadside unit 2 included in the nearby roadside unit list, which is successively updated by the roadside unit manager F4, the transmission terminal determiner F5 determines whether a roadside unit 2 existing in the vicinity of the subject terminal is to provide services to the subject terminal.

A roadside unit 2 that is to provide services to the subject terminal is a roadside unit that provides services to a vehicle traveling in a lane (i.e., local lane) where the vehicle in which the subject terminal is mounted (i.e., subject vehicle) is traveling. A roadside unit 2 that is not to provide services to the subject terminal may be, for example, a roadside unit 2 that provides services to a vehicle traveling in an opposite lane or other lane where the subject vehicle is not traveling. Obviously, the roadside unit 2 that is not to provide services to the subject terminal may be, for example, a roadside unit 2 that provides services to a vehicle traveling on a road crossing the subject vehicle lane in the vicinity of an intersection or a vehicle traveling on a road at a different height from a road on which the subject vehicle is traveling. Two roads at different heights may be, for example, a highway and a local road that is built along the highway.

For the sake of convenience, a roadside unit 2 that is to provide services to the subject terminal will be hereinafter referred to as a roadside unit 2 for the subject terminal. Meanwhile, a roadside unit 2 that is not to provide services to the subject terminal be hereinafter referred to as a roadside unit 2 not for the subject terminal.

Figure 8:
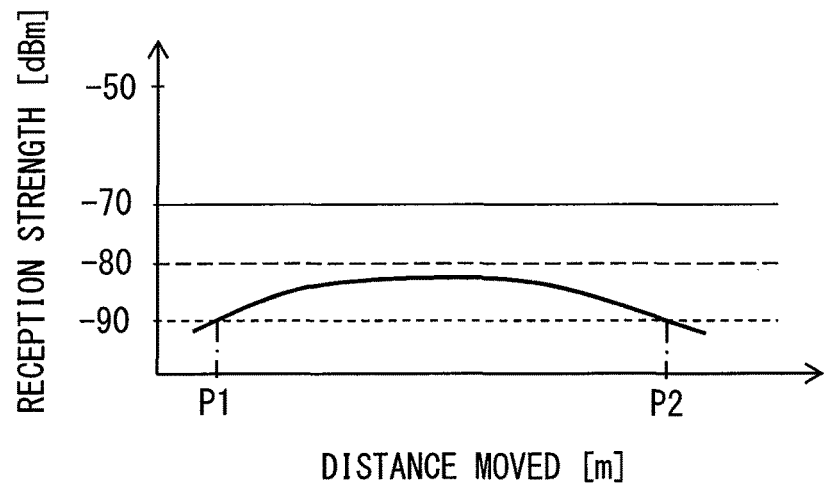
FIG. 8 is a diagram illustrating reception strength changes caused by movement when a received signal is transmitted from a roadside unit that provides services targeted for vehicles traveling in an opposite lane.
Figure 9:
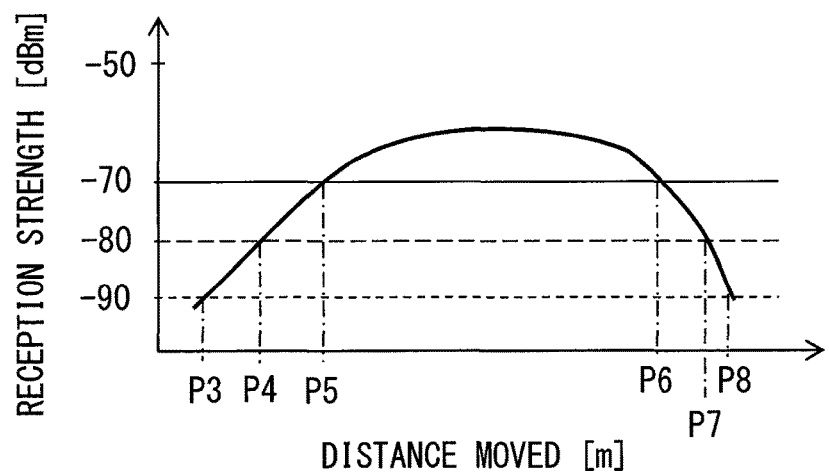
FIG. 9 is a diagram illustrating reception strength changes caused by movement when a received signal is transmitted from a roadside unit that provides services targeted for a lane where a subject vehicle travels.

Based on the tendency of reception strength change and the magnitude of reception strength of a WSA received from a roadside unit 2, the transmission terminal determiner F5 determines whether the roadside unit 2 is a roadside unit 2 for the subject terminal. FIGS. 7, 8, and 9 are now used to describe the reason why the transmission terminal determiner F5 is able to determine, based on the tendency of reception strength change and the magnitude of reception strength of a WSA received from a roadside unit 2, whether the roadside unit 2 is a roadside unit 2 for the subject terminal.

FIG. 7 illustrates a case where a roadside unit 2A and a roadside unit 2B are installed along a road having lanes LA, LB where vehicles travel in opposite directions. The roadside unit 2A provides services to vehicles traveling in the lane LA. The roadside unit 2B provides services to vehicles traveling in the lane LB.

The roadside unit 2A is a roadside unit 2 that is installed on the lane LA side of the road and adapted to provide, for example, a traffic information transmission service to vehicles traveling in the lane LA. The roadside unit 2B is a roadside unit 2 that is installed on the lane LB side of the road and adapted to provide, for example, a traffic information transmission service to vehicles traveling in the lane LB.

White arrows for the lanes LA, LB in FIG. 7 indicate the travel direction of vehicles in a lane. The travel direction of vehicles traveling in the lane LA is leftward in FIG. 7, and the travel direction of vehicles traveling in the lane LB is rightward.

A short-dashed line 33A, a long-dashed line 32A, and a solid line 31A in FIG. 7 represent the boundary of a range within which the level of a signal transmitted from the roadside unit 2A is greater than or equal to a predetermined level. The short-dashed line 33A represents the boundary of a range within which, for example, the level of a WSA transmitted from the roadside unit 2A maintains its decoding limit level (e.g., −90 dBm). That is, the range enclosed by the short-dashed line 33A indicates the wireless communication area of the roadside unit 2A. Within the wireless communication area, the WSA transmitted from the roadside unit 2A can be received (and decoded).

The long-dashed line 32A represents the boundary of a range (i.e., intermediate level area) within which the level of the WSA transmitted from the roadside unit 2A maintains a level (e.g., −80 dBm) is stronger by at least a predetermined amount than the decoding limit level. The solid line 31A represents the boundary of a range (i.e., strong level area) within which the WSA transmitted from the roadside unit 2A maintains an even stronger level (e.g., −70 dBm).

A short-dashed line 33B, a long-dashed line 32B, and a solid line 31B in FIG. 7 represent the boundary of a range within which the level of a signal transmitted from the roadside unit 2B is greater than or equal to a predetermined level, and correspond to the short-dashed line 33A, the long-dashed line 32A, and the solid line 31A, respectively.

As illustrated in FIG. 7, the wireless communication area of the roadside unit 2B is formed so as to reach the lane LA where vehicles to which the roadside unit 2B does not provide services travel. In this instance, a WSA transmitted from the roadside unit 2A is received by not only vehicles traveling in the lane LB but also vehicles traveling in the lane LA.

Obviously, the wireless communication area of the roadside unit 2 is preferably formed to include an area (lane LB) that is passed through by vehicles to which services are to be provided, and exclude an area (lane LA) that is passed through by vehicles to which services are not to be provided. An example illustrated here shows a case where the wireless communication area of the roadside unit 2B is formed to reach the lane LA.

A vehicle 6 in which the onboard unit 1 is mounted is traveling in the lane LA from a point P0 toward a point where the roadside unit 2A exists. At the point P0, the vehicle 6 has not reached the wireless communication area of the roadside unit 2B. For the onboard unit 1, the traffic information transmission service by the roadside unit 2A and the traffic information transmission service by the roadside unit 2B are both registered as a service available to the subject terminal. An arrow 61 indicates the movement path of the vehicle 6 (or, more strictly, the onboard unit 1).

A WSA received by the onboard unit 1 and its reception strength change during the travel of the vehicle 6 in the above-described situation will now be described.

First of all, when the vehicle 6 travels to reach a point P1, the vehicle 6 begins to receive a WSA transmitted from the roadside unit 2B. Subsequently, the vehicle 6 successively receives the WSA transmitted from the roadside unit 2B until the vehicle 6 passes through a point P2. The point P1 is a point where the onboard unit 1 enters the wireless communication area of the roadside unit 2B. The point P2 is a point where the onboard unit 1 leaves the wireless communication area of the roadside unit 2B.

FIG. 8 is a conceptual diagram illustrating reception strength changes in a WSA that is transmitted from the roadside unit 2B and received by the onboard unit 1 while the onboard unit 1 moves from the point P1 to the point P2. The horizontal axis of FIG. 8 represents the movement distance of the onboard unit 1, and the vertical axis represents the reception strength of the WSA received by the onboard unit 1.

As illustrated in FIG. 8, the reception strength changes in the WSA transmitted from the roadside unit 2B during the movement from the point P1 to the point P2 are more moderate than when a later-described WSA transmitted from the roadside unit 2A is received (see FIG. 9). Further, the maximum value of the reception strength is also smaller than when the WSA transmitted from the roadside unit 2A is received.

The reason is that the roadside unit 2B, which provides services to vehicles traveling in the lane LB, is designed to place the center (an area where signal strength is high) of the wireless communication area in the lane LB. Further, a signal transmitted from the roadside unit 2 (the roadside unit 2B in the current example) attenuates with an increase in the distance to the roadside unit 2B as indicated by the solid line 31B, the long-dashed line 32B, and the short-dashed line 33B in FIG. 7.

Consequently, a WSA having a high signal strength is not likely to reach the lane LA where vehicles not targeted for the services are traveling. In a situation illustrated, for example, in FIGS. 7 and 8, the vehicle 6 crosses an area between the short-dashed line 33B and the long-dashed line 32B, where the signal strength is relatively low. Therefore, the reception strength changes during the movement are relatively moderate. That is, while the onboard unit 1 is receiving a WSA from a roadside unit 2 not for the subject terminal, the reception strength changes during the movement are moderate. Further, the maximum value of the reception strength is also relatively small.

Reception strength changes during the movement of the onboard unit 1 that are caused when the onboard unit 1 receives a WSA transmitted from a roadside unit 2 for the subject terminal (the roadside unit 2A in the current example) will now be described.

Referring to FIG. 7, a point P3 is a point where the onboard unit 1 enters the wireless communication area of the roadside unit 2A, and a point P8 is a point where the onboard unit 1 leaves the wireless communication area of the roadside unit 2A. When the vehicle 6 travels to reach the point P3, the vehicle 6 begins to receive a WSA transmitted from the roadside unit 2A. Subsequently, the vehicle 6 successively receives the WSA transmitted from the roadside unit 2A until the vehicle 6 passes through the point P8.

The roadside unit 2A is a roadside unit 2 that provides services to vehicles traveling in the lane LA. Therefore, the roadside unit 2A is designed to place the center (an area where signal strength is high) of its wireless communication area in the lane LA. If no obstacle exists to interrupt radio waves, the reception strength of a WSA from the roadside unit 2A increases with a decrease in the distance to the roadside unit 2A. That is, when the subject vehicle travels from the point P3, the reception strength of a signal transmitted from the roadside unit 2A and received by the onboard unit 1 increases. Subsequently, when the subject vehicle further travels, the subject vehicle leaves the roadside unit 2A. Thus, the reception strength of a WSA transmitted from the roadside unit 2A decreases.

During the above sequence, the onboard unit 1 travels to pass through a point near the center of the wireless communication area of the roadside unit 2A. It signifies that the onboard unit 1 travels to pass through a plurality of boundaries (long-dashed line 32A, solid line 31A, etc.) that conceptually indicate areas where a signal transmitted from the roadside unit 2A maintains a predetermined strength (see FIG. 7).

FIG. 9 is a conceptual diagram illustrating reception strength changes in a WSA that is transmitted from the roadside unit 2A and received by the onboard unit 1 while the onboard unit 1 moves from the point P3 to the point P8. The horizontal axis of FIG. 9 represents the movement distance of the onboard unit 1, and the vertical axis represents the reception strength of the WSA transmitted from the roadside unit 2.

A point P4 in FIG. 9 is a point where the onboard unit 1 enters an area (i.e., intermediate level area) that is enclosed by the long-dashed line 32A, and a point P5 is a point where the onboard unit 1 enters an area (i.e., strong level area) that is enclosed by the solid line 31A. A point P6 is a point where the onboard unit 1 leaves the strong level area of the roadside unit 2A, and a point P7 is a point where the onboard unit 1 leaves the intermediate level area of the roadside unit 2A.

The onboard unit 1 travels to pass through a point near the center of the wireless communication area of the roadside unit 2A. Therefore, as illustrated in FIG. 9, the degree of reception strength change caused when the onboard unit 1 approaches and leaves the roadside unit 2A is greater than the degree of reception strength change in a WSA transmitted from the roadside unit 2B due to the movement of the onboard unit 1. More specifically, the degree of reception strength increase when the onboard unit 1 approaches the roadside unit 2A is greater than the degree of reception strength increase due to the movement of the onboard unit 1 when the onboard unit 1 approaches the roadside unit 2B.

Further, the degree of reception strength decrease when the onboard unit 1 leaves the roadside unit 2A is greater than the degree of reception strength decrease when the onboard unit 1 leaves the roadside unit 2B. Here, the degree of increase and the degree of decrease correspond to the magnitude of slope of graphs shown in FIGS. 8 and 9. The degree of increase may be, for example, the amount of increase per unit meters. The degree of decrease may be, for example, the amount of decrease per unit meters.

Moreover, when the onboard unit 1 is sufficiently close to the roadside unit 2A, the reception strength is saturated so that the amount of its change is moderate. It is conceivable that the reception strength in such an instance is great enough to be distinguishable from a case where the onboard unit 1 is closest to the roadside unit 2B.

As described above, the changes in reception strength and the magnitude of reception strength in a case where the onboard unit 1 receives a WSA from a roadside unit 2 for the subject terminal (e.g., roadside unit 2A) are different from the changes in reception strength and the magnitude of reception strength in a case where the onboard unit 1 receives a WSA from a roadside unit 2 not for the subject terminal (e.g., roadside unit 2B).

The transmission terminal determiner F5 in the present embodiment uses the above-described changes in reception strength and the difference in the maximum value of reception strength to determine whether a roadside unit 2 transmitting a currently received WSA is a roadside unit 2 for the subject terminal.

If, for example, the degree of reception strength increase is equal to or greater than a predetermined threshold value (approach threshold value), the associated roadside unit 2 is determined to be a roadside unit 2 for the subject terminal. The reason is that the degree of reception strength increase is expected to be equal to or greater than a fixed threshold value when the onboard unit 1 is close to a roadside unit 2 for the subject terminal. That is, by using the approach threshold value determined based on the above idea, the transmission terminal determiner F5 can determine whether a roadside unit 2 is a roadside unit 2 for the subject terminal. If the degree of reception strength increase is equal to or greater than the approach threshold value, it not only implies that the roadside unit 2 is a roadside unit 2 for the subject terminal, but also indicates that the onboard unit 1 is close to the roadside unit 2.

The approach threshold value used here may be appropriately designed based on various tests and simulations. The approach threshold value may be the amount of increase in reception strength per predetermined movement distance. The predetermined movement distance may be, for example, 1 meter, 5 meters, or 10 meters.

The degree of reception strength increase to be compared with the approach threshold value may be calculated based on the approach threshold value. If, for example, the approach threshold value is the amount of reception strength increase per meter, the degree of reception strength increase may be the amount of reception strength increase per meter.

An example illustrated here shows a case where whether a roadside unit 2 having transmitted a received signal is a roadside unit 2 for the subject terminal is determined based on the degree of reception strength increase caused by movement. However, the present disclosure is not limited to such a case. For example, as described later in conjunction with a third modification, whether a roadside unit 2 having transmitted a received signal is a roadside unit 2 for the subject terminal may be determined based on the degree of reception strength increase over time. The reason is that the position of the onboard unit 1 can be expected to move over time because the onboard unit 1 is mounted on a vehicle.

Further, the reception strength of a WSA from a roadside unit 2 not for the subject terminal, such as the roadside unit 2B for an opposite lane, changes at relatively low levels. Meanwhile, the reception strength of a WSA from a roadside unit 2 for the subject terminal is expected to reach a considerably high level.

Consequently, if the reception strength of a WSA is at a level that is not supposed to be reached in the case of a WSA received from a roadside unit 2 not for the subject terminal, it is conceivable that the onboard unit 1 is receiving a WSA from a roadside unit 2 for the subject terminal.

That is, a roadside unit 2 transmitting a WSA exhibiting a reception strength equal to or greater than a predetermined threshold value (strength threshold value Pth) can be determined to be a roadside unit 2 for the subject terminal. The strength threshold value Pth may be designed to be great enough to not receive from a roadside unit 2 not for the subject terminal.

Based on radio waves received at a plurality of points of time and the movement information, which are stored as the reception history data for each roadside unit 2, the degree-of-change calculator F6 in the transmission terminal determiner F5 calculates the degree of reception strength increase. For example, a plurality of previous position information are referenced in order from the latest to acquire reception strength at a previous point that is at a predetermined distance from position information of the current point of time (or the latest position information). The amount of increase per predetermined distance (i.e., the degree of increase) is then calculated from the difference between the current reception strength (or the latest reception strength) and the acquired reception strength. Here, the predetermined distance may correspond to the approach threshold value.

If data exactly matching the predetermined distance is not found in the past data, interpolation using two nearest data may be performed for the determination. If the WSA is received multiple times at the same point (or at substantially the same point) when, for instance, the subject terminal is stopped, a value representing the highest reception strength may be used to calculate the degree of increase. The reason is that the reception strength may be changed by the presence of a different movable object while the subject terminal is stopped.

Based on the service list stored in the memory 11M, the service type determiner F7 determines whether services provided by a roadside unit 2 existing in the vicinity of the subject terminal are available to the subject terminal. The roadside unit 2 existing in the vicinity of the subject terminal corresponds to a roadside unit 2 registered in the nearby roadside unit list. The services provided by the roadside unit 2 may be identified by the service type information included in the roadside unit information about the roadside unit 2.

More specifically, if the service ID of a service provided by the roadside unit 2 is registered in the service list, the service type determiner F7 determines that the service corresponding to the WSA is available to the subject terminal. By contrast, if the service ID of a service provided by the roadside unit 2 is not registered in the service list, the service type determiner F7 determines that the service corresponding to the WSA is unavailable to the subject terminal.

(Reception-Related Process)

Figure 10:
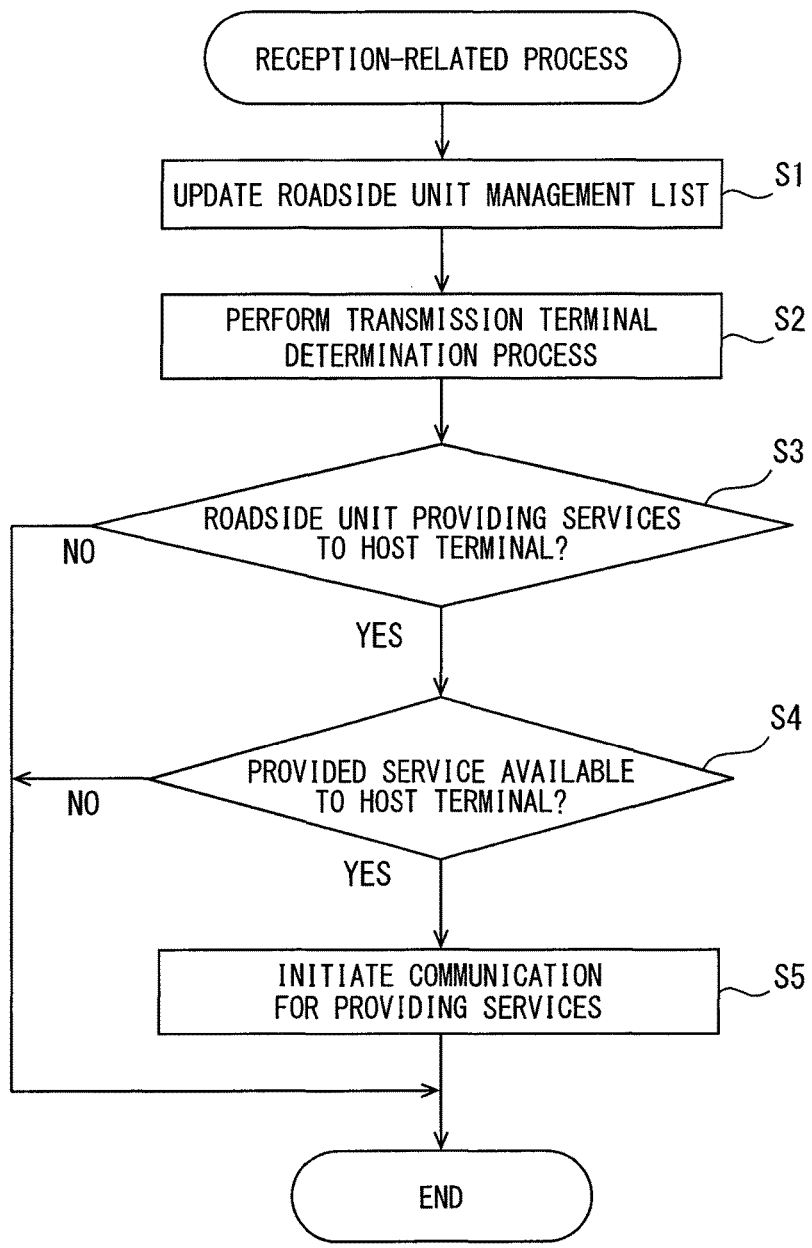
FIG. 10 is a flowchart illustrating a reception-related process performed by the controller.

The reception-related process performed by the controller 11 will now be described with reference to the flowchart of FIG. 10. When a WSA transmitted from a roadside unit 2 is received, the reception-related process is triggered to determine whether or not to initiate communication with the roadside unit 2 by using a service channel for receiving a service provided by the roadside unit 2. Accordingly, the flowchart of FIG. 10 may be started when the narrow area communication controller F1 receives a WSA.

First of all, in step S1, the roadside unit manager F4 acquires data about the received WSA and its reception strength from the narrow area communication controller F1 and updates the nearby roadside unit list. That is, a terminal ID included in the WSA is used to identify a roadside unit 2 from which the WSA is transmitted (hereinafter referred to as the transmission terminal), and then the roadside unit information about the transmission terminal is updated.

If the WSA transmitted from the transmission terminal is received for the first time, the transmission terminal is added to the nearby roadside unit list, and the roadside unit information based on the WSA is generated and stored.

If the roadside unit information about the transmission terminal already exists, data (reception time, reception strength, position, speed, etc.) about the currently received WSA is added to the reception history data in the roadside unit information.

Upon completion of step S1, processing proceeds to step S2. In step S2, the transmission terminal determiner F5 performs a transmission terminal determination process. Upon completion of step S2, processing proceeds to step S3. The transmission terminal determination process is performed to determine whether the transmission terminal is a roadside unit 2 for the subject terminal.

More specifically, first of all, the degree-of-change calculator F6 calculates the degree of reception strength increase based on the reception history data about the transmission terminal. The transmission terminal determiner F5 then determines whether the degree of increase calculated by the degree-of-change calculator F6 is equal to or greater than the approach threshold value. If the degree of increase is equal to or greater than the approach threshold value, the transmission terminal is determined to be a roadside unit 2 for the subject terminal. By contrast, if the degree of increase is not equal to or greater than the approach threshold value, the transmission terminal is not determined to be a roadside unit 2 for the subject terminal.

Further, the transmission terminal determiner F5 determines whether the reception strength of the currently acquired WSA (that is, the latest WSA) is equal to or greater than the strength threshold value Pth. If the reception strength of the currently acquired WSA is equal to or greater than the strength threshold value Pth, the transmission terminal is determined to be a roadside unit 2 for the subject terminal. By contrast, if the reception strength of the currently acquired WSA is not equal to or greater than the strength threshold value Pth, the transmission terminal is not determined to be a roadside unit 2 for the subject terminal.

If the result of the transmission terminal determination process in step S2 indicates that the transmission terminal is determined to be a roadside unit 2 for the subject terminal, step S3 is "YES", and then processing proceeds to step S4. By contrast, if the result of the transmission terminal determination process in step S2 indicates that the transmission terminal is not determined to be a roadside unit 2 for the subject terminal, step S3 is "NO", and then the flow illustrated in FIG. 10 terminates.

If, in step S2 where the transmission terminal determination process is performed, the reception history data about the transmission terminal is not sufficient enough to calculate the degree of increase, that is, the number of receptions is still insufficient, the transmission terminal determination process may be performed simply by comparing the reception strength with the strength threshold value Pth. Alternatively, if the number of receptions is still insufficient, the flow illustrated in FIG. 10 may be terminated, as is the case where step S3 is "NO", without determining that the transmission terminal is a roadside unit 2 for the subject terminal.

In step S4, the service type determiner F7 determines whether the service provided by the transmission terminal is available to the subject terminal. If the service provided by the transmission terminal is not available to the subject terminal, step S4 is "NO", and the flow illustrated in FIG. 10 terminates. That is, the service channel indicated by the WSA does not open.

By contrast, if the service provided by the transmission terminal is available to the subject terminal, step S4 is "YES", and processing proceeds to step S5.

In step S5, the narrow area communication controller F1 initiates communication with the roadside unit 2 by using a service channel indicated by the channel use information included in the roadside unit information about the transmission terminal.

An example illustrated above shows a case where a process of determining the service type (step S4) is performed after the transmission terminal determination process (step S2). However, the present disclosure is not limited to such a case. An alternative is to perform the above-described reception-related process only on a transmission terminal that provides services available to the subject terminal. That is, above-described reception-related process may be performed when the service type information included in a received WSA indicates a service available to the subject terminal. Using such an alternative saves the bother of managing the roadside unit information about a roadside unit 2 providing services unavailable to the subject terminal and performing the transmission terminal determination process.

SUMMARY OF PRESENT EMBODIMENT

In the above-described configuration, upon receipt of a WSA from a roadside unit 2, the transmission terminal determiner F5 determines whether the degree of increase in the reception strength of the WSA received from the roadside unit 2 is equal to or greater than the predetermined approach threshold value, and determines whether the reception strength of the received WSA is equal to or greater than the predetermined strength threshold value Pth (step S2). If the result of determination indicates that the degree of increase in the reception strength of the WSA received from the roadside unit 2 is equal to or greater than the approach threshold value, or indicates that the reception strength of the received WSA is equal to or greater than the strength threshold value Pth (step S3: YES), the communication on a service channel with the roadside unit 2 starts (step S4).

Further, the approach threshold value and strength threshold value Pth used in step S2, where the transmission terminal determination process is performed, are set based on the difference in the tendency of reception strength change and in the magnitude of reception strength between a case where a WSA is received from a roadside unit 2 for the subject terminal and a case where a WSA is received from a roadside unit 2 not for the subject terminal, as explained with reference to FIGS. 7 to 9.

Consequently, when the above-described configuration is employed, whether a transmission terminal from which the WSA is received is a roadside unit 2 for the subject terminal can be determined. This enables the subject terminal to suppress the initiation of communication on a predetermined service channel with a roadside unit 2 not for the subject terminal.

Furthermore, the transmission terminal determiner F5 in the above-described configuration not only compares the degree of reception strength increase with the approach threshold value but also compares the magnitude of reception strength with the strength threshold value Pth to determine whether a transmission terminal from which the WSA is received is a roadside unit 2 for the subject terminal.

Accordingly, whether the transmission terminal from which the WSA is received is a roadside unit 2 for the subject terminal can be determined more properly even in the following situation.

For example, although the subject terminal is sufficiently close to a roadside unit 2 for the subject terminal, the subject terminal may be unable to receive a WSA from the roadside unit 2 because radio waves from the roadside unit 2 are interrupted by a large vehicle existing between the roadside unit 2 and the subject terminal. Here, a state where the subject terminal is sufficiently close to the roadside unit 2 is a state where the onboard unit 1 exists in the strong level area indicated, for example, in FIG. 7.

In the above situation, the positional relationships between the large vehicle and the roadside unit 2 and between the subject vehicle and the roadside unit 2 may change to permit the subject terminal to receive the WSA from the roadside unit 2A.

In the above instance, the onboard unit 1 is sufficiently close to the roadside unit 2. Thus, the onboard unit 1 suddenly receives a strong WSA as indicated, for example, in FIG. 11. A point Q1 in FIG. 11 represents a point where the onboard unit 1 begins to receive the WSA from the roadside unit 2. A thick line in the graph of FIG. 11 indicates strength changes in the received WSA. A broken line in the graph represents estimated reception strength of the WSA that is not actually received due to the existence, for example, of a large vehicle.

Further, in the above situation, the reception strength of the WSA from the roadside unit 2 is saturated (sufficiently increased). Therefore, it is possible that the degree of increase may not be equal to or greater than the approach threshold value.

That is, if a comparison is made only between the degree of increase and the approach threshold value, a transmission terminal that should be determined to be a roadside unit 2 for the subject terminal may not be determined to be a roadside unit 2 for the subject terminal.

Accordingly, not only when the degree of increase is equal to or greater than the approach threshold value but also when the reception strength is equal to or greater than the strength threshold value Pth, the present embodiment determines that the transmission terminal is a roadside unit 2 for the subject terminal. Therefore, even if the subject terminal begins to receive a WSA from the roadside unit 2 after the subject terminal is close to the roadside unit 2 so that the reception strength is saturated, the determination of whether the roadside unit 2 is a roadside unit 2 for the subject terminal can be made properly. A two-dot chain line in FIG. 11 represents the strength threshold value Pth.

In order to permit the degree-of-change calculator F6 to calculate the degree of increase, it is necessary to receive a WSA multiple times from the same transmission terminal. Meanwhile, the determination concerning the relationship between the reception strength and the strength threshold value Pth can be made based on the reception strength of the single WSA (i.e., a newly received WSA).

As described above, when the subject terminal is sufficiently close to the roadside unit 2A, the subject terminal may shortly leave the transmission terminal. Therefore, if a service provided by the transmission terminal is available to the subject terminal, it may be preferable that communication on a service channel with the transmission terminal be initiated as soon as possible.

Even if a WSA is received for the first time when the subject terminal is sufficiently close to the roadside unit 2A, the configuration according to the present embodiment enables the subject terminal to immediately initiate communication on a service channel with the transmission terminal based on the comparison between the reception strength and the strength threshold value.

An example illustrated above shows a case where whether the transmission terminal from which a WSA is received is a roadside unit 2 for the subject terminal is determined by comparing the degree of reception strength increase with the approach threshold value and comparing the magnitude of reception strength with the strength threshold value Pth. However, the present disclosure is not limited to such a case.

For example, the transmission terminal determination process may be performed by comparing the magnitude of reception strength with the strength threshold value Pth without comparing the degree of reception strength increase with the approach threshold value. However, when only the strength threshold value Pth is used for the transmission terminal determination process, the following issues arise.

If the strength threshold value Pth is relatively low, it is highly probable that a roadside unit 2 not for the subject terminal, such as a roadside unit for the opposite lane, may be erroneously determined to be a roadside unit 2 for the subject terminal. By contrast, if the strength threshold value Pth is relatively high, the probability of a roadside unit 2 not for the subject terminal being erroneously determined to be a roadside unit 2 for the subject terminal can be suppressed. However, the communication on a service channel with the transmission terminal cannot be initiated until the subject terminal is sufficiently close to a roadside unit 2 for the subject terminal. This delays the reception of a service. That is, the determination of the strength threshold value Pth is difficult because it is necessary to consider the balance between the suppression of erroneous determination and the delay in the initiation of communication.

Meanwhile, when the degree of increase is compared with the approach threshold value, whether the transmission terminal is a roadside unit 2 for the subject terminal can be determined before the subject terminal is sufficiently close to the roadside unit 2A, that is, while the subject terminal is approaching the roadside unit 2. That is, when the degree of increase is compared with the approach threshold value, the communication on a service channel with the roadside unit 2 can be initiated before the onboard unit 1 is sufficiently close to the roadside unit 2. This suppresses the delay in the reception of a service.

Further, when the degree of increase is compared with the approach threshold value, a determination criterion for the transmission terminal determination process performed while the onboard unit 1 is approaching the roadside unit 2 and a determination criterion for the transmission terminal determination process performed when the subject terminal is sufficiently close to the roadside unit 2 can be used selectively by substance. That is, the determination may be made by comparing the degree of increase with the approach threshold value while the onboard unit 1 is approaching the roadside unit 2, and by comparing the reception strength with the strength threshold value Pth when the subject terminal is sufficiently close to the roadside unit 2.

In fact, when the comparison between the degree of increase and the approach threshold value and the comparison between the reception strength and the strength threshold value are both made, the approach threshold value and the strength threshold value can be set based on the positional relationship between the onboard unit 1 and the roadside unit 2. Thus, whether the transmission terminal is a roadside unit 2 for the subject terminal can be determined more properly when the onboard unit 1 is approaching the roadside unit 2 and when the subject terminal is sufficiently close to the roadside unit 2.

While the present disclosure has been described above in conjunction with an embodiment, the embodiment may be modified or extended as described below. It should be understood that further variations may be made without departing from the spirit and scope of the present disclosure.

<First Modification>

The foregoing embodiment has been described on the assumption that the onboard unit 1 has the strength threshold value Pth. However, the present disclosure is not limited to such a configuration. For example, the onboard unit 1 without the strength threshold value Pth may alternatively be used to permit a roadside unit 2 to transmit a WSA (see FIG. 12) including information about required reception strength, which specifies the strength threshold value. In such an alternative configuration, upon receipt of a WSA including the information about required reception strength, the onboard unit 1 uses the strength threshold value based on the information about required reception strength to determine whether the roadside unit 2 is a roadside unit 2 for the subject terminal.

Further, even if the onboard unit 1 receives a WSA including the information about required reception strength when the onboard unit 1 has a pre-registered strength threshold value Pth, the onboard unit 1 may preferentially use the strength threshold value based on the information about required reception strength to determine whether the roadside unit 2 is a roadside unit 2 for the subject terminal.

In the above-described modification, the onboard unit 1 is able to use the strength threshold value based on the installation environment of a roadside unit 2 to determine whether the roadside unit 2 is a roadside unit 2 for the subject terminal.

<Second Modification>

If, in the first modification described above, while communication on a service channel is performed with a roadside unit 2 transmitting a WSA including the information about required reception strength, the reception strength of a signal received from a roadside unit 2 is lower than the reception strength indicated by the information about required reception strength acquired from the roadside unit 2, the communication on the service channel with the roadside unit 2 may be terminated by preforming a predetermined procedure.

<Third Modification>

In the foregoing, the degree of reception strength increase is calculated as the amount of reception strength increase caused by the movement of the subject terminal, and the approach threshold value is based on the movement distance and the amount of reception strength change. However, the present disclosure is not limited to such a scheme. For example, the degree of reception strength increase may be the amount of reception strength increase over time (i.e., the amount of reception strength increase per unit time), and the approach threshold value may be designed based on the amount of reception strength change per unit time.

The reason is that the position of the onboard unit 1, which is mounted in a vehicle, is expected to move over time.

In the above instance, a plurality of different approach threshold values are preferably prepared based on movement speed so that they increase with an increase in the movement speed. Alternatively, the approach threshold value to be used may be designed based on a predetermined speed and dynamically corrected based on the movement speed.

<Fourth Modification>

If, in the third modification described above, the movement speed is equal to or lower than a predetermined threshold value, the degree of reception strength increase may not be compared with the approach threshold value to determine whether the transmission terminal is a roadside unit 2 for the subject terminal. The reason is that when the amount of movement of the onboard unit 1 is small, the accuracy of determination may lower due to decreased changes in the reception strength. The threshold value used here is to be designed as appropriate and may be, for example, equal to a speed (approximately 10 km/h) at which the subject vehicle crawls.

<Fifth Modification>

When communication has been established on a service channel with a roadside unit 2 and normally terminated according to a predetermined procedure, the transmission terminal determiner F5 may exclude the roadside unit 2 from the transmission terminal determination process. The reason is that when communication has been established on a service channel with a roadside unit, it signifies that a service provided by the roadside unit 2 has been received. Thus, it is conceivable that reestablishing communication on a service channel with the roadside unit 2 is of low necessity.

Whether a roadside unit 2 has established communication on a service channel may be determined by a flag that is included in the roadside unit information to indicate whether communication has been established. For example, when communication on a service channel with a roadside unit 2 is terminated according to a normal procedure, the status of the flag should be changed to indicate that communication has been established. It is assumed that information indicative of whether communication has been established is reset (set to a state where communication has not been established) when the roadside unit 2 is deleted from the nearby roadside unit list.

<Sixth Modification>

The controller 11 may include a distance change determiner F8 (see FIG. 13). When a WSA is received, the distance change determiner F8 determines, based on the reception history data about a transmission terminal from which the WSA is received, whether the subject terminal is approaching or leaving the transmission terminal. For example, the distance change determiner F8 may reference the reception history data about the transmission terminal. If the reception history data indicates a tendency of reception strength increase, the distance change determiner F8 may determine that the subject terminal is approaching the transmission terminal. By contrast, if the reception history data indicates a tendency of reception strength decrease, the distance change determiner F8 may determine that the subject terminal is leaving the transmission terminal. The distance change determiner F8 corresponds to a departure determiner.

If, in the above-described modification, a roadside unit 2 has already established communication on a service channel and is determined by the distance change determiner F8 to be leaving the subject terminal, the narrow area communication controller F1 may exclude the roadside unit 2 from the transmission terminal determination process.

Further, if the distance change determiner F8 determines that the subject terminal is leaving a roadside unit 2 with which communication on a service channel is not performed, the narrow area communication controller F1 may perform the transmission terminal determination process on that roadside unit 2 in preference to a different roadside unit 2.

<Seventh Modification>

The foregoing embodiment assumes that the degree-of-change calculator F6 calculates the degree of reception strength increase. However, the present disclosure is not limited to such a scheme. Alternatively, the degree-of-change calculator F6 may calculate the degree of reception strength decrease by a method similar to the method of calculating the degree of reception strength increase. Here, the degree of reception strength decrease is an index indicating that when the index is greater, the reception strength decreases greatly.

When the onboard unit 1 leaves a roadside unit 2 for the subject terminal, the degree of reception strength decrease is greater than when the onboard unit 1 leaves a roadside unit 2 not for the subject terminal, as is seen from FIGS. 8 and 9.

Accordingly, when the degree of reception strength decrease is equal to or greater than a predetermined threshold value (departure threshold value), it signifies that the associated roadside unit 2 is a roadside unit 2 for the subject terminal. Obviously, when the degree of reception strength decrease is equal to or greater than the departure threshold value, it additionally signifies that the subject terminal is leaving the roadside unit 2 for the subject terminal.

Consequently, using the departure threshold value determined based on the above idea enables the transmission terminal determiner F5 to determine whether a transmission terminal from which a WSA is received is a roadside unit 2 for the subject terminal. That is, the transmission terminal determiner F5 determines that the subject terminal is targeted for services from a roadside unit 2 that is associated with a degree of reception strength decrease that is equal to or greater than the departure threshold value.

According to the above-described modification, even if a WSA from a roadside unit 2 is interrupted, for example, by a large vehicle, and then received by the subject terminal when it begins to leave the roadside unit 2, the roadside unit 2 can be determined to be a roadside unit 2 for the subject terminal. As a result, communication can be performed on a service channel with the roadside unit 2.

Further, the time available for communication with a transmission terminal from which a WSA begins to be received after the subject terminal starts leaving the transmission terminal is shorter than the time available for communication with a different roadside unit 2 approaching the subject terminal. Therefore, communication with a roadside unit 2 determined to be a roadside unit 2 for the subject terminal as a result of comparison between the degree of reception strength decrease and the departure threshold value is preferably established on a service channel in preference to a different roadside unit 2.

<Eighth Modification>

The foregoing assumes that the roadside unit 2 functions as the service provider terminal. However, the present disclosure is not limited to such a scheme. For example, the onboard unit 1 may be used as the service provider terminal. That is, the service provider terminal may be a communication terminal used in a movable object.

Further, the foregoing assumes that the communication terminals perform communication in compliance with the WAVE standard. However, the present disclosure is not limited to such a scheme. The communication terminals may alternatively perform communication in compliance with a different communication standard corresponding to the WAVE standard. In such an instance, a channel used to perform substantial communication for providing (and receiving) a service corresponds to a service channel, and a channel used to transmit information for initiating communication on such a service channel (i.e., information corresponding to a WSA) corresponds to the control channel.

What is claimed is:

1. A vehicular communication terminal comprising:
    a wireless communicator that wirelessly communicates with a service provider terminal, the service provider terminal providing a predetermined service by using a control channel and any one of a plurality of service channels, the control channel being used to provide connection control for communication, the service channels being different from the control channel and assigned to provide the service; and
    a wireless communication controller that controls operations of the wireless communicator;
    wherein the wireless communicator is adapted to receive at least service initiation information including service type information and service channel information, the service type information being transmitted on the control channel from the service provider terminal and indicative of type of service provided by the service provider terminal, the service channel information designating one of the service channels that is to be used for communication between the service provider terminal and the vehicular communication terminal;

the vehicular communication terminal further comprising:

a reception strength acquirer that acquires reception strength of a signal transmitted from the service provider terminal and received by the wireless communicator; and a transmission terminal determiner that, when the wireless communicator receives a signal corresponding to the service initiation information from the service provider terminal, determines, based on at least either one of magnitude of the reception strength of the received signal acquired by the reception strength acquirer and a degree of reception strength change in signal received from the service provider terminal serving as a transmission source of the received signal corresponding to the service initiation information, whether the transmission source of the received signal corresponding to the service initiation information is the service provider terminal that provides a service targeted for the vehicular communication terminal, wherein the transmission source of the received signal corresponding to the service initiation information is referred to as a transmission terminal, wherein until the transmission terminal determiner determines that the transmission terminal is the service provider terminal that provides the service targeted for the vehicular communication terminal, the wireless communication controller does not initiate communication with the transmission terminal by using the service channel designated by the service channel information included in the service initiation information transmitted from the transmission terminal.

2. The vehicular communication terminal according to claim 1, further comprising:

a degree-of-change calculator that calculates a degree of reception strength increase in signal transmitted from the transmission terminal, the reception strength being acquired by the reception strength acquirer;

wherein:

when the degree of increase calculated by the degree-of-change calculator is equal to or greater than an approach threshold value, the transmission terminal determiner determines that the transmission terminal is the service provider terminal that provides the service targeted for the vehicular communication terminal, the approach threshold value being used to determine whether the vehicular communication terminal is approaching the service provider terminal that provides the service targeted for the vehicular communication terminal.

3. The vehicular communication terminal according to claim 1, further comprising:

a degree-of-change calculator that calculates a degree of reception strength increase in signal transmitted from the transmission terminal, the reception strength being acquired by the reception strength acquirer;

wherein when the degree of increase calculated by the degree-of-change calculator is equal to or greater than an approach threshold value, or when the reception strength acquired by the reception strength acquirer is equal to or greater than a strength threshold value, the transmission terminal determiner determines that the transmission terminal is the service provider terminal that provides the service targeted for the vehicular communication terminal, the approach threshold value being used to determine whether the vehicular communication terminal is approaching the service provider terminal that provides the service targeted for the vehicular communication terminal, the strength threshold value being used to determine whether a signal transmitted from the service provider terminal that provides the service targeted for the vehicular communication terminal is received.

4. The vehicular communication terminal according to claim 3, wherein:

the service initiation information includes information about required reception strength specifying the strength threshold value; and when the service initiation information including the information about the required reception strength is received from the service provider terminal and the reception strength acquired by the reception strength acquirer is equal to or greater than the strength threshold value determined by the information about the required reception strength included in the service initiation information received from the service provider terminal, the transmission terminal determiner determines that the service provider terminal is the service provider terminal that provides the service targeted for the vehicular communication terminal.

5. The vehicular communication terminal according to claim 2, wherein:

the degree-of-change calculator calculates a degree of reception strength decrease in signal transmitted from the transmission terminal acquired by the reception strength acquirer; and when the degree of decrease calculated by the degree-of-change calculator is equal to or greater than a departure threshold value, the transmission terminal determiner determines that the transmission terminal is the service provider terminal that provides the service targeted for the vehicular communication terminal, the departure threshold value being used to determine whether the vehicular communication terminal is leaving the service provider terminal that provides the service targeted for the vehicular communication terminal.

6. The vehicular communication terminal according to claim 2, wherein the degree-of-change calculator calculates, as the degree of increase, an amount of increase in the reception strength with respect to a movement distance of the vehicular communication terminal.

7. The vehicular communication terminal according to claim 2, wherein the degree-of-change calculator calculates, as the degree of increase, an amount of increase in the reception strength per unit time.

8. The vehicular communication terminal according to claim 7, further comprising:

a movement information acquirer that acquires movement information for determining movement speed of the vehicular communication terminal;

wherein the transmission terminal determiner does not compare the degree of increase with the approach threshold value when the movement speed of the vehicular communication terminal determined from the movement information acquired by the movement information acquirer is equal to or lower than a predetermined threshold value.

9. The vehicular communication terminal according to claim 1, wherein:

when the transmission terminal is not determined to be the service provider terminal that provides the service targeted for the vehicular communication terminal, the transmission terminal determiner successively determines, each time the wireless communicator receives a signal from the transmission terminal, whether the transmission terminal is the service provider terminal that provides the service targeted for the vehicular communication terminal; and until the transmission terminal is determined to be the service provider terminal that provides the service targeted for the vehicular communication terminal, the transmission terminal continues to be determined not to be the service provider terminal that provides the service targeted for the vehicular communication terminal.

10. The vehicular communication terminal according to claim 1, further comprising:

a departure determiner that, when there is a tendency of decrease in the reception strength of signals transmitted from the transmission terminal, determines that the vehicular communication terminal is leaving the transmission terminal, the reception strength being acquired by the reception strength acquirer;

wherein when the departure determiner determines that the vehicular communication terminal is leaving the transmission terminal, the transmission terminal determiner excludes the transmission terminal from a process of determining whether the transmission terminal is the service provider terminal that provides the service targeted for the vehicular communication terminal.

* * * * *